United States Patent
Magaldi

(10) Patent No.: US 10,337,734 B2
(45) Date of Patent: Jul. 2, 2019

(54) PLANT FOR DRY CONVEYING OF SLAG AND / OR HETEROGENOUS MATERIALS

(71) Applicant: MAGALDI INDUSTRIE S.R.L., Salerno (IT)

(72) Inventor: Mario Magaldi, Salerno (IT)

(73) Assignee: MAGALDI INDUSTRIE S.R.L., Salerno (IT)

( * ) Notice: Subject to any disclaimer, the term of this patent is extended or adjusted under 35 U.S.C. 154(b) by 627 days.

(21) Appl. No.: 14/415,899

(22) PCT Filed: Jul. 19, 2013

(86) PCT No.: PCT/IB2013/055942
§ 371 (c)(1),
(2) Date: Jan. 20, 2015

(87) PCT Pub. No.: WO2014/013472
PCT Pub. Date: Jan. 23, 2014

(65) Prior Publication Data
US 2015/0184852 A1  Jul. 2, 2015

(30) Foreign Application Priority Data
Jul. 20, 2012 (IT) .............................. RM2012A0351

(51) Int. Cl.
*F23J 1/02* (2006.01)
*B65G 15/08* (2006.01)
(Continued)

(52) U.S. Cl.
CPC ................ *F23J 1/02* (2013.01); *B65G 15/08* (2013.01); *B65G 15/28* (2013.01); *B65G 15/62* (2013.01);
(Continued)

(58) Field of Classification Search
CPC ...... F23J 1/02; F23J 2700/00; F23J 2700/001; F23J 2700/003; B65G 15/08; B65G 15/62;
(Continued)

(56) References Cited

U.S. PATENT DOCUMENTS

| 4,887,539 A | 12/1989 | Magaldi |
| RE34,814 E | 1/1995 | Magaldi |

(Continued)

FOREIGN PATENT DOCUMENTS

| DE | 37 31 140 | 3/1988 |
| EP | 0 252 967 | 1/1988 |

(Continued)

OTHER PUBLICATIONS

Int'l Search Report for PCT/IB2013/055942, seven pages (Mar. 2014).

(Continued)

*Primary Examiner* — David J Laux
(74) *Attorney, Agent, or Firm* — Nixon & Vanderhye P.C.

(57) ABSTRACT

A transport system for the transport of combustion waste, comprising:—a belt conveyor for transporting the waste, arranged at the bottom of a combustion chamber and apt to transport the waste onto a transport surface (311) movable along a longitudinal direction of advancement; and—side boards (81, 82) for containing the waste in a transport region (80), arranged above said transport surface, ratably connected to a casing of the conveyor and bearing wearable members (811, 812) apt to establish a sliding seal with lateral fins (312, 313) of the movable transport surface of the conveyor belt, so that the transported material be confined in the transport region defined by said movable transport surface and by said boards bearing the wearable members.

14 Claims, 8 Drawing Sheets

(51) Int. Cl.
*B65G 15/28* (2006.01)
*B65G 15/62* (2006.01)
*B65G 17/10* (2006.01)
*B65G 21/20* (2006.01)

(52) U.S. Cl.
CPC ......... *B65G 17/10* (2013.01); *B65G 21/2081* (2013.01); *B65G 2207/22* (2013.01); *F23J 2219/80* (2013.01); *F23J 2700/001* (2013.01)

(58) Field of Classification Search
CPC . B65G 17/10; B65G 21/2072; B65G 21/2081
See application file for complete search history.

(56) References Cited

U.S. PATENT DOCUMENTS

| | | |
|---|---|---|
| 2010/0206203 A1 | 8/2010 | Magaldi |
| 2012/0183376 A1* | 7/2012 | Magaldi ............... B65G 17/067 414/196 |

FOREIGN PATENT DOCUMENTS

| | | |
|---|---|---|
| EP | 1 097 886 | 5/2001 |
| FR | 1148404 | 12/1957 |
| GB | 327 533 | 4/1930 |
| JP | H01-103615 | 7/1989 |
| JP | 2001-354316 | 12/2001 |
| JP | 2005-263422 | 9/2005 |
| JP | 2010-519493 | 6/2010 |
| JP | 2010-528249 | 8/2010 |
| WO | 87/04231 | 7/1987 |
| WO | 2008/142594 | 11/2008 |
| WO | 2011/027309 | 3/2011 |

OTHER PUBLICATIONS

Written Opinion for PCT/IB2013/055942, eight pages (Mar. 2014).
Communication pursuant to Art. 94(3) in EP 13773358 dated Nov. 11, 2017.
Notification of Reasons for Refusal in JP 2015-522236 dated Feb. 15, 2017.

* cited by examiner

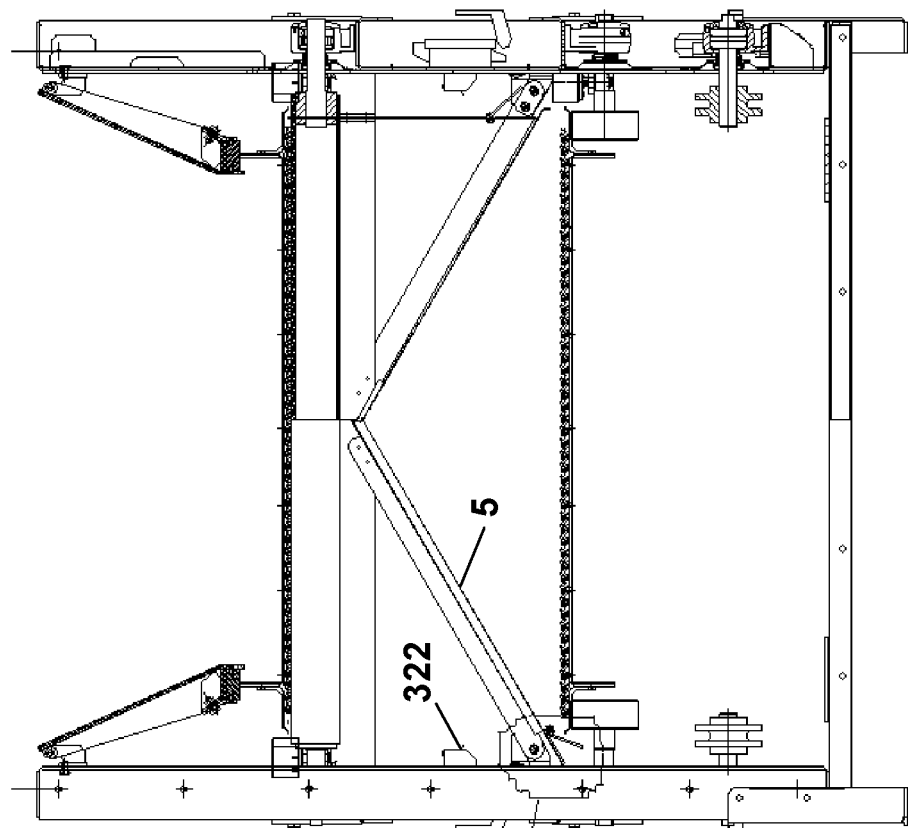
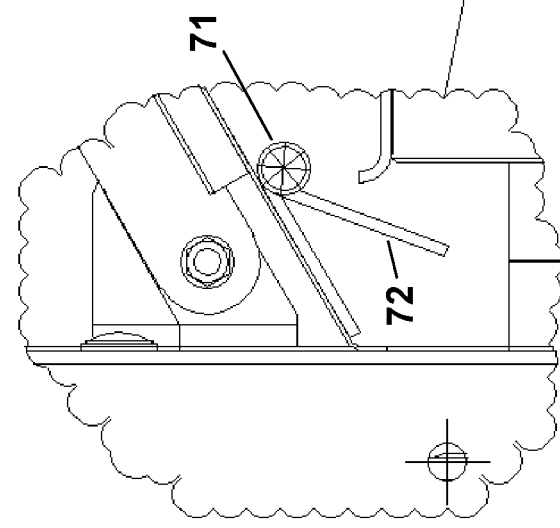
FIG. 3
FIG. 3A

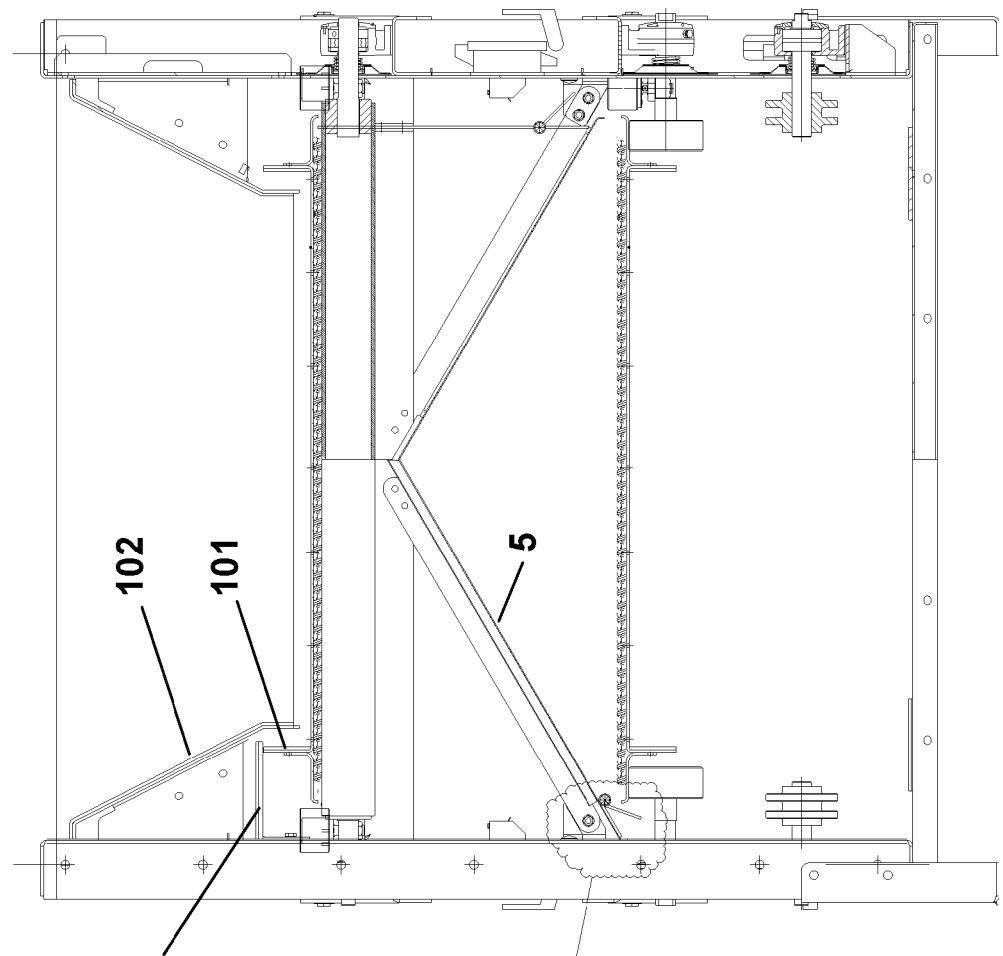
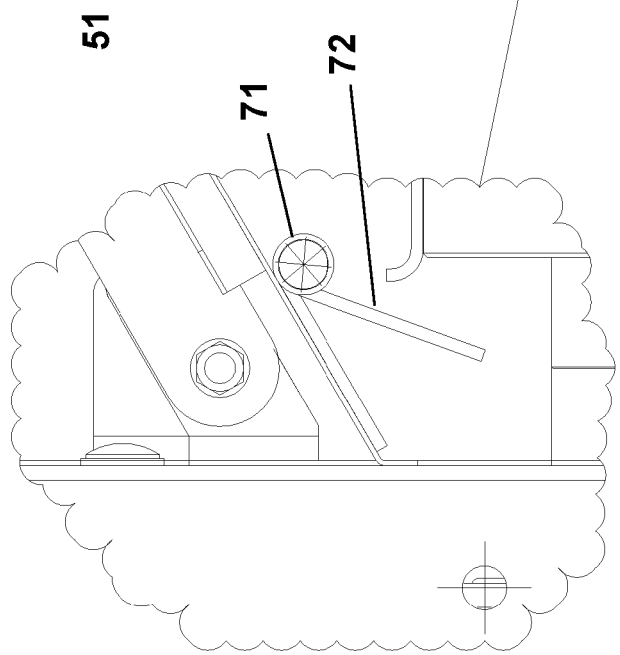
FIG. 5
FIG. 5A

PLANT FOR DRY CONVEYING OF SLAG AND / OR HETEROGENOUS MATERIALS

This application is the U.S. national phase of International Application No. PCT/IB2013/055942, filed on 19 Jul. 2013, which designated the U.S. and claims priority to IT Application No. RM2012A000351, filed on 20 Jul. 2012; the entire contents of each of which are incorporated herein by reference.

FIELD OF THE INVENTION

The present invention relates to a plant for the extraction, transport and/or cooling of combustion waste or other loose material, also very fine material, and specifically to a plant of the type apt to be employed in association with a combustion chamber, with a fume dedusting system or with a reaction chamber/furnace.

The plant is particularly suitable for use in case of waste consisting in loose material, also heterogeneous one, for instance deriving from the combustion of Municipal Solid Waste, or in case of metal scraps.

BACKGROUND OF THE INVENTION

Known mechanical systems for dry transportation and/or cooling of loose material—for instance ash or waste that have undergone a combustion process—provide various solutions for containment, conceived to confine the material in a transport region, preventing its outlet to the external environment or anyhow its pouring out of said confined region. A system for extraction and transport of the aforedescribed type is that of EP 2 480 830.

In such mechanical transport systems, particularly those normally employed for ashes produced in a combustion chamber of an incinerator, it is necessary to ensure operation continuity of the system and therefore of the plant in which it is included. Crucial to such reliability of operation is the avoiding of interference of heterogeneous materials, above all metal ones, with stationary and moving parts of the extraction and transport system.

In particular, the mechanical dry transport systems considered herein are based on a metal conveyor belt enclosed in a casing and associated with appropriate means for collecting fines from the bottom of the casing. Such collecting means is comprised, e.g., of chains or pendulum or shovel systems hinged to the belt.

Known belt conveyors do not guarantee a high reliability of operation when the material to be transported is of heterogeneous type, and in particular comprised of material both fine and large-sized, of varying chemico-physical nature and, above all, in the presence of incompressible materials, like e.g. metal matters. These materials can come out, or anyway interfere with the mechanical solutions for containment, or even fall onto the bottom of the casing, thereby acting on the fines recovering means. In that case, loose material fallen onto the bottom can block recovering means operation, or anyway cause bindings and stoppages of the main mechanical transport system, compromising its reliability and causing unforeseen and potentially lengthy downtimes.

The abovementioned belt conveyors are typically applied not only for the extraction of material from process boilers or furnaces, but also for transport, post-combustion, cooling or drying operations carried out with a gas that is inlet into the belt conveyor environment, typically in countercurrent to the material transported. In particular, there may be provided the inletting of a hot gas, or of a gas for chemical or physical treatments deriving from gas interaction with the material transported, or also of ambient air for cooling.

In presence of gas for the abovementioned treatments, in particular thermal treatments or of other nature, it may be necessary both to permeate the material with such gas during transport on the belt, and to maintain the degree of reduction reached by the material in upstream process furnaces (e.g. by Nitrogen). In that case, treatment gas should not be dispersed in the environment, both to avoid consumption thereof and to safeguard the environment.

In particular, when the material to be transported is heavy ash, coming from a boiler, which ash falls into the belt system from the bottom of said boiler, known dry transport systems provide for air-assisted cooling of the ash bed present on the belt. Cooling air can be recalled into the transport system by the negative pressure present in the boiler, by passing through specially provided openings of the containment casing of the belt conveyor. Air therefore crosses the system and the ash bed in countercurrent to the direction of advancement, thereby operating ash and apparatuses cooling. An extraction and cooling system of the aforedescribed type is that of EP 0 252 967.

In known systems of the aforedescribed type, ash cooling efficiency depends upon the exposed surface available for heat exchange with air, and on the ability to attain an effective conveying of the air at the ash, allowing the desired interaction level.

Moreover, cooling air is returned into the boiler from the bottom thereof, bringing in the heat content removed from the ash. However, the amount of cooling air that can re-enter the boiler without interfering with combustion process efficiency is limited and ranging from 1.0 to 1.5% of total combustion air.

Hence, a further perfectible aspect of the known transport and cooling systems is linked to heat exchange modes between transported material and cooling air. Such perfectibility is particularly important in case of high flow rates of produced ash.

On the basis of what has been explained hereto, for the transport, the post-combustion and/or the dry cooling of heterogeneous material, e.g. coming from incinerators but also from solid-fuel boilers, and for the transport in inert environment in case of material that has undergone a reduction treatment, it is necessary to deal with the need for mechanical transport continuity and reliability, as well as with needs for optimal cooling without interfering with in-boiler combustion process efficiency, as well as again for needs of treatment gas containment in the transport zone.

SUMMARY OF THE INVENTION

In view of what has been stated in the previous section, the technical problem addressed and solved by the present invention is to provide a system for the transport of waste coming from a combustion chamber or of other loose materials coming from a different industrial system such as for example a fume deduster or a reaction oven, that is optimized in terms of containment/confinement of the material inside a transport region and/or in terms of interaction between the transported solid material and a treatment gas, typically cooling air or a specific technic gas, by obviating to the above-mentioned drawbacks of the prior art.

This problem is solved by a transport system according to claim 1.

Preferred characteristics of the present invention are defined in the dependent claims.

As illustrated in greater detail hereinafter, a particularly preferred embodiment of the invention provides at least a main extractor/transport belt, enclosed in a containment casing and having a transport surface moving according to a transport direction longitudinal to the belt. The belt conveyor is preferably connected to, or in any case associated with, the throat of a combustion chamber.

The belt allows to transport ash exiting from the bottom of this combustion chamber in a transport region delimited bottomwise by the transport surface of the belt and confined laterally by lateral containment means. These means comprises abutment members, preferably in the form of sliding blocks of wearable material, placed along the longitudinal transport direction. These sliding blocks, or equivalent abutment components, are suitable for remaining constantly in contact with the movable portion of the belt conveyor, in particular with vertical profiles, preferably fins, placed on the sides of the mobile transportation surface and fixed to said surface. Preferably, these profiles or fins are fixed to plates of the transport belt that define said mobile transport surface. Preferably, these profiles, or the sliding blocks, constitute a continuous structure of longitudinal partitions rising from the transport surface. Therefore these sliding blocks operate by sliding on the profile of said plates. Preferably, the sliding blocks—or other abutment elements equivalent thereto—are made of a material with a smaller hardness than the hardness of the metal that constitutes the above mentioned vertical profiles or fins, for example of bronze or of any other metal adapted to resist to high temperatures—or even a synthetic or organic material suitable for withstanding to the characteristics of the transported material. Preferably, the material of these abutment elements, or sliding blocks, is a wearable material.

Preferably, the containment means provide a possibility of external regulation such to act on the position of the sliding block or of any other abutment element with respect to the mobile portion of the belt it abuts against, in order to ensure the best contact and to obtain the best possible seal.

The sliding blocks are associated with, and preferably fixed to, lateral containment boards of the transported material, in their turn connected to the casing of the belt conveyor. The boards are preferably rotatable and in particular they are pivoted on the casing of the belt conveyor.

The lateral containment boards are preferably made of modules that may be placed side by side at the load zone or along the whole longitudinal extension, that is the whole length, of the conveyor belt.

Preferably, the abutment elements, and in particular the above mentioned sliding blocks, are placed at the whole longitudinal extension of the transport surface, even independently from their association with the just mentioned lateral boards.

In particular, (also) the abutment elements may be realized in modules adapted to be placed side by side along the longitudinal extension of the transport surface.

As stated above, preferably the lateral boards are connected in a rotating manner, for example hinged, to the casing of the belt or in any case they are movable with respect to it. In this way, they may be displaced, in particular they may be lifted, by possible incompressible material that comes into contrast between the mobile belt and the fixed board, thus preventing risky crawlings of the transport belt. At the same time, preferably the configuration is such that the boards and the abutment members fixed thereto come back—once the above mentioned material is removed—in the primary configuration in a passive way, in particular by means of gravity and/or elastic contrast forces.

Said characteristic of the lateral boards of being displaced, in particular lifted up, is particularly useful also for favoring the maintenance of the boards themselves and of the sliding blocks connected thereto.

The configuration that provides contact between the wearable sliding block and the upper edge of the array of containment fins of the belt is particularly important for the obtainment of an effective seal between the moving belt and the containment board. Indeed, the sliding of the upper edges of the fins on the fixed sliding block determines the wear of the soft material of the sliding block, so as to allow the obtainment of a groove adapted to contain the upper edge of the fins to a desired extent by regulating the position of the containment boards to which the sliding blocks are fixed, as better explained later on.

Said groove-seal is equivalent to a labyrinth that cooperates to obtain an effective seal for dust, gas or any other type of transported material.

The above mentioned containment means based on abutment members (sliding blocks) associated with moving lateral boards ensure an isolation of the transport region and thus a confinement of the material present on the belt. Possible metal elements have no possibility of interfering with the moving mechanical parts external to the transport region.

Moreover, the section of the belt conveyor contained between the transport surface and the cover, that may be properly isolated, is particularly adapted to allow possible treatments, physical or chemical, of the transported material, such as for example inertization, drying, post-combustion, cooling, without involving the lower section of the transport system. For example, as better described hereinafter, in the upper section high temperature material may be transported without thermally influencing the lower section of the belt conveyor.

In case the invention is applied to a system for the extraction and transport of ash or of any other material requiring a post-combustion, a cooling or in any case a treatment with a gas, for example Nitrogen, the above-mentioned containment means thus prevent or in any case reduce lateral leakages of post-combustion/cooling air—and in general of the treatment gas—outside the transportation region or inlets from the outer environment to the inside. This feature ensures an effective interaction between gas and transported material, besides not causing losses of this gas and of possible dust towards the outside.

In this application relating to the treatment of the transported material with a technical gas, for example Nitrogen, a preferred configuration of the invention, advantageously applied in case of high temperature of the transported material, provides that only the upper transport region be provided with an external containment casing, the lower portion of the belt conveyor being possibly open such as to allow thermal exchange of the belt with the air of the environment during the return path, thus operating as a regeneration heat exchanger. As stated before, the confinement in the upper transportation zone of the material and of the treatment gas is ensured by the interaction of said abutment elements (sliding blocks) on the fins of the transport belt with the metal casing of the transport zone.

In case of an application relative to air cooling or to gas treatment, a further preferred configuration of the invention provides also one or more regions subdivided into compartments below the transport surface of the belt. In this case the belts further presents, at the transport surface, dedicated apertures—typically holes or slits in the form of milling— that allow, for example, the flow of cooling air from the outer environment throughout the belt and thus throughout the layer of material.

In particular, in case of direct connection of the transport system of the invention to the bottom of the combustion chamber, typically under a negative pressure, the transport region too is at a negative pressure, thus allowing a reflow of cooling air from outside in the compartmented region or regions.

Throughout the bored belt and the layer of material, air is sucked in the combustion chamber.

In this cooling configuration, the containment means that define the transport region above the transport surface of the belt and the compartment subdivision below it allows conveying cooling air throughout the bores-slits of the belt, thus minimizing leakages of air outside the areas of interest. Therefore, when cooling air crosses the bed of transported material, it realizes with it a so-called "cross-flow" thermal exchange, with an efficiency of thermal exchange outstandingly greater than that of the already known dry cooling systems, and this thanks to the increased surface of material involved in the thermal exchange.

The just described configuration is advantageously adopted even in case of post-combustion of the transported material wherein interactions between combustion air and material are the same.

Moreover, particularly in the above cited cooling configuration, the invention allows a strong reduction of the ratio between amount of cooling air and flow of cooled material and thus allows minimizing the amount of cooling air possibly introduced back in the combustion chamber from the bottom, with a consequent increase of the overall efficiency of the system.

A further preferred embodiment provides that the system of the invention—in particular when used for bulk dusty material and when a containment casing of the belt conveyor is provided—be advantageously associated with a cleaning system of the type disclosed in PCT/IB2009/051943, that is herein incorporated by this reference.

The invention allows maximizing the reliability of transport of heterogeneous material, of increasing the efficiency of thermal exchange between the transported material on the belt and air or other treatment gas and of maximizing the exchange surface of the material exposed to the treatment gas and to reduce the emission of the latter outside.

The invention provides further relevant advantages, such as the prevention of unexpected stops of the conveyor due to crawlings and interferences with the moving mechanical parts caused by incompressible elements present in the transported material such as in case of heterogeneous material present in dry ash of urban or industrial waste as well as in transport of metal scraps.

It is particularly useful in this case the application of platelets hinged to the casing of the conveyor and transversal to the moving direction of the belt—or of equivalent means—that projects towards the transport surface. These platelets or equivalent means are configured to allow passage of the material, being lifted by it, and to obstacle or reduce air or gas flow sucked back by the system upstream such as for example a combustion chamber working at a negative pressure.

Therefore, as stated above, the invention may be applied to the transport and/or extraction not only of combustion waste but also of loose materials and may thus contemplate two main configuration: one enclosed in a containment casing that covers the whole belt conveyor and provides systems for cleaning the bottom adapted to the type of transported material; and a configuration in which the sole transport region has a containment cover, thus the backwards portion of the transport belt is not necessarily equipped with a bottom neither is it associated with cleaning systems.

BRIEF DESCRIPTION OF THE FIGURES

Other advantages, features and the operation modes of the present invention will be explained in the following detailed description of some preferred embodiments of the invention, given by way of example and not for limitative purposes. Reference will be made to the figures of the annexed drawings, wherein:

FIG. 3 shows a schematic cross-sectional view of the plant of FIG. 1, performed along the line A-A of the latter and related to a second preferred embodiment of the belt conveyor of said plant;

FIG. 3A shows a magnified detail of the belt conveyor of FIG. 3;

FIG. 5 shows a schematic cross-sectional view of the plant of FIG. 1, performed along the line A-A of the latter and suitable to highlight a further variant embodiment of the belt conveyor;

FIG. 5A shows a magnified detail of the belt conveyor of FIG. 5;

DETAILED DESCRIPTION OF PREFERRED EMBODIMENTS

Figure 1:
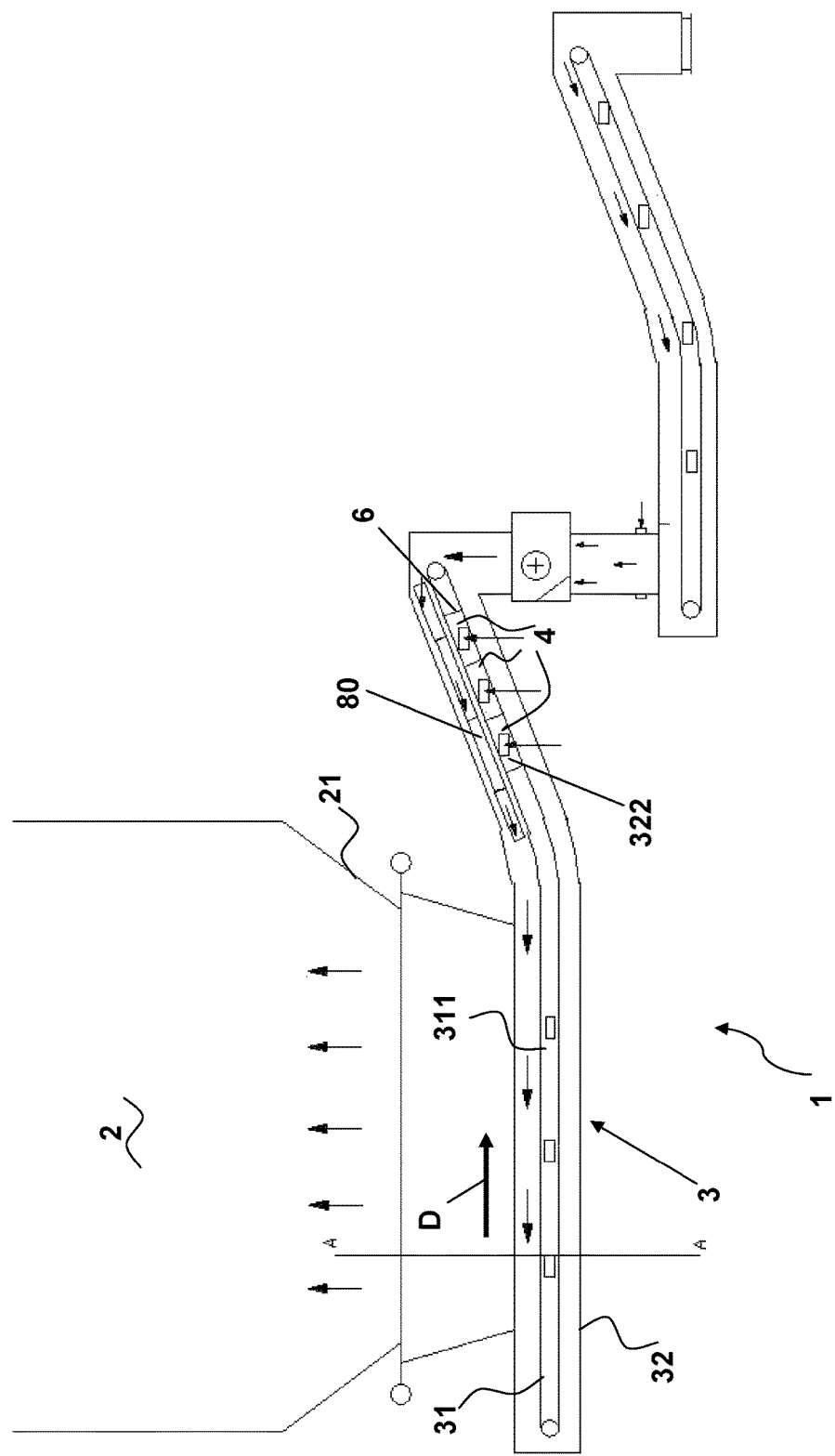
FIG. 1 shows a schematic representation in side view of a plant for the extraction, transport and cooling of ashes according to a preferred embodiment of the invention.

With reference now to FIG. 1, a system for the transport of combustion waste according to a preferred embodiment of the invention is generally indicated by the reference numeral 1.

The system 1 according to the present embodiment is associated with, and in particular directly connected to, a bottom of a combustion chamber or boiler 2 and removes the heavy ashes that precipitate at said boiler bottom. In particular, the apparatus 1 is designed for heterogeneous ashes obtained by the combustion of waste or for ashes that comprise large-sized chunks of molten waste.

The boiler 2 can be part of the system 1 or can be provided independently from it, and it comprises a removal hopper 21, the inner surface of which is typically coated with a fire-resistant material.

First of all, the system 1 comprises conveyor means 3 in turn comprising a continuous conveyor belt 31 adapted to withstand high temperature, preferably developed according to a closed path. A first end of the conveyor belt 31 is arranged at the boiler bottom 2 to receive the ashes from the hopper 21. According to a typical working configuration, in a forward run, the conveyor belt transports the ashes in the form of a continuous bed on a movable transport surface 311 that corresponds to the top part of the conveyor belt path. The advancement direction of the movable transport surface 311 is longitudinal with respect to the conveyor belt 31 and indicated with an arrow D in FIG. 1.

Figure 2:
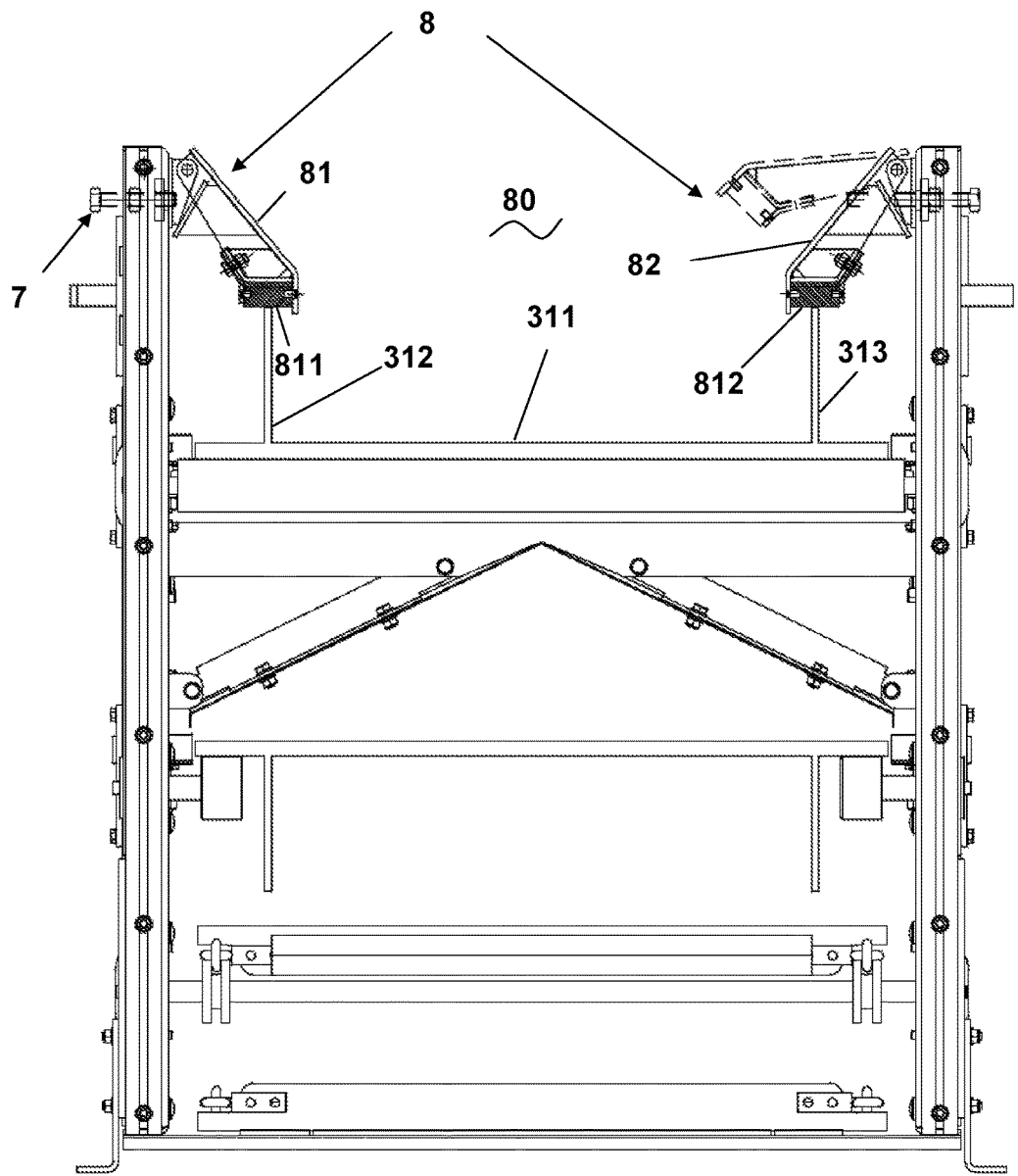
FIG. 2 shows a schematic cross-sectional view of the plant of FIG. 1, performed along the line A-A of the latter and related to a first preferred embodiment of a belt conveyor of said plant.

As better shown in FIG. 2, the movable transport surface 311 comprises a pair of longitudinal partitions or vertical elements, in particular vertical fins, respectively indicated with the reference numerals 312 and 313; each fin integrally projects from a respective longitudinal side of said transport surface 311.

The conveyor belt 31 of the conveyor means 3 is housed in a sealed manner inside a casing 32, typically made of metal.

As explained in more detail hereafter, the system 1 is adapted to carry out a dry cooling of the ashes by adducting air at ambient temperature at the conveyor belt 31. To this purpose, inlets 322 for the cooling air taken from the outside are formed in the casing 32 of the conveyor means 3.

The conveyor belt 31 and the casing 32 can have a general construction as described in EP 0 252 967 or EP 0 931 981, herein incorporated by this reference.

As better shown in FIG. 2, the system 1 also comprises ash containment means, generally indicated with the numeral 8, and adapted to contain the ashes at a transport region. This transport region, generally denoted by 80, is defined at the bottom by the transport surface 311, at the top by the casing 32 and laterally by the containment means 8 and the fins 312, 313 of the movable transport surface 311.

The containment means 8 comprises a pair of side boards 81, 82 respectively, positioned above said transport surface 311 each at fins 312, 313.

Preferably each side board 81, 82 is movable, preferably raisable or in any case movable away with respect to the transport surface 311. In the present embodiment, each side board 81, 82 is pivotable, in particular hinged at the casing 32 of the conveyor 3. Moreover, always according to the present embodiment, each side board 81, 82 is in a slanting arrangement with respect to the transport surface 311, the two boards 81, 82 converging one towards the other.

An abutment member 811, 812, in particular a sliding block, is associated with each of said boards 81, 82, in the present example in a fixed manner. Each sliding block 811, 812 is applied at an end of the relative board 81, 82 in a proximal position with respect to the continuous extension of the fins 312, 313 of the transport surface 311.

Each sliding block 811, 812 is arranged so as to abut in a sliding manner on said transport surface 311, and with particular reference to the present embodiment, on a correspondent fin 312, 313 of the transport surface 311.

The overall arrangement is therefore such that each board 81, 82 is adapted to assume a first transport configuration, in which the respective sliding block 811, 812 abuts on the respective fin 312, 313 of the transport surface 311, preventing lateral leaks of the ash, and a second transport configuration, wherein each board 81, 82 is displaced to allow the transport of large-sized chunks of ash.

Figure 7A:
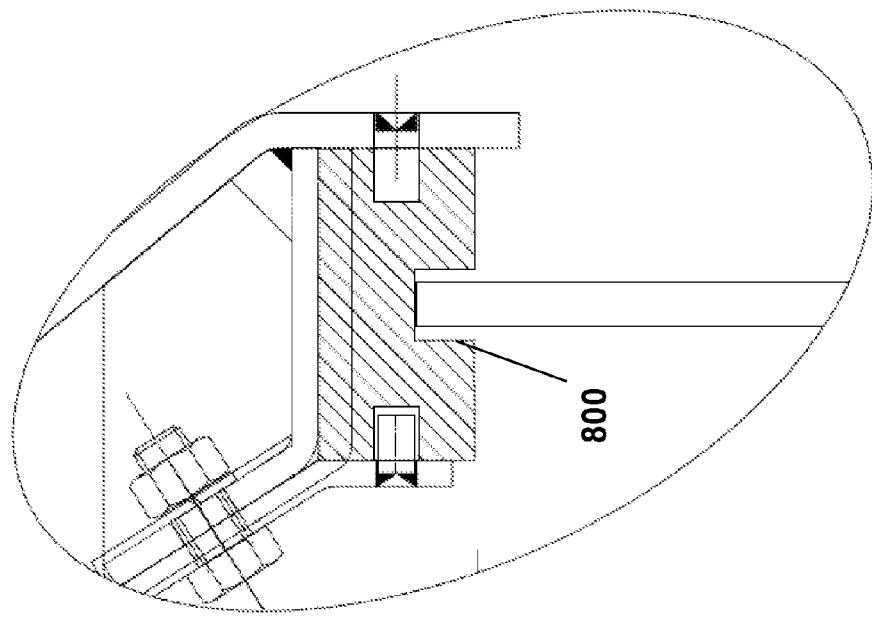
FIG. 7A shows a magnified detail of FIG. 7, referring to an element common also to the plant of the embodiment of FIGS. 1 to 5, shown after repeated cycles of operation in a sliding manner.

As already mentioned, each sliding block 811, 812 is a component wearable following the repeated sliding contact on the respective fin 312, 313. The contact between the fins 312, 313 and the respective sliding block 811, 812 determines formation of a groove at the contact area, as shown in FIG. 7A. More in detail, such groove is formed on each sliding block 811, 812 following the repeated sliding contact with fins 312, 313 and the weight force of the boards 81, 82. The depth of the groove is controlled by the adjustment system 7 described later on.

The width of each sliding block is such to form a groove large enough to compensate for the small lateral displacements of the fins 312, 313 of the transport surface 311.

As already mentioned, the formation of the groove is controlled by an appropriate adjustment of the angular position of the boards 81, 82, preferably via a screw system 7. An adjustment such as to ensure the formation of the grooves on the sliding blocks provides for the direct contact of the sliding blocks 811, 812 on the fins 312, 313 and an angular position such as to unload the weight of the board on the continuous profile of the flaps, ensuring the continuous contact between the two pairs.

To the purpose of the formation of the groove, each sliding block 811, 812 has a transversal dimension of contact with the respective partition 312, 313 that is larger than the corresponding dimension of the partition. In other words, the partition wedges in the respective abutment member. Preferably, the boards 81, 82 and the relative sliding blocks 811, 812 have a longitudinal extension so as to extend onto the whole transport surface 311.

Thus, the containment means 8 are adapted to confine laterally the transport region 80 to avoid leaking or spilling of elements, also of incompressible ones, present in the transported material.

Preferably, the transport surface 311 with its fins 312, 313 are made of steel and the sliding blocks 811, 812 are preferably made of bronze or another material with a low friction coefficient, also as a function of the working temperatures.

The boards 81, 82 can be made of steel and possibly in a fire-resistant material, in particular in the zone of the conveyor belt facing the bottom of the boiler 2, where they are affected by the radiation of the boiler. The boards 81, 82 can also have a thermal insulation, for example below the metal surface facing the transport region 80.

The use of platelets (not shown), hinged to the casing of the conveyor belt and transversal with respect to the motion direction of the belt, is particular useful. Such platelets are configured so as to permit the passage of the material, being lifted by the material, and to reduce or prevent the flow of air or gas sucked from the upstream system, e.g. the aforementioned combustion chamber that works in a negative pressure condition.

Figure 4:
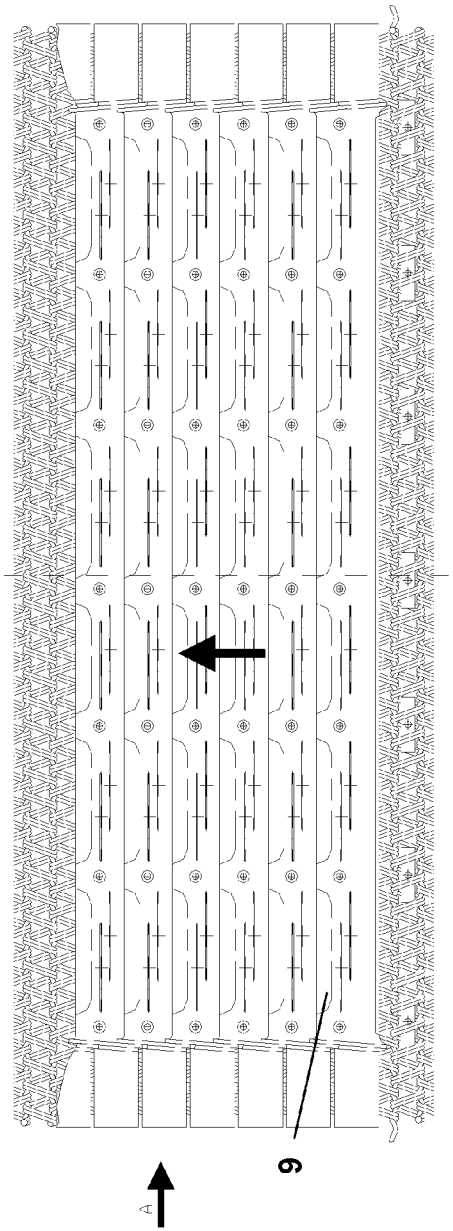
FIG. 4 shows a plan view of part of a conveyor belt of the plant of FIG. 1, highlighting openings for transit of a flow of cooling air.
Figure 4A:
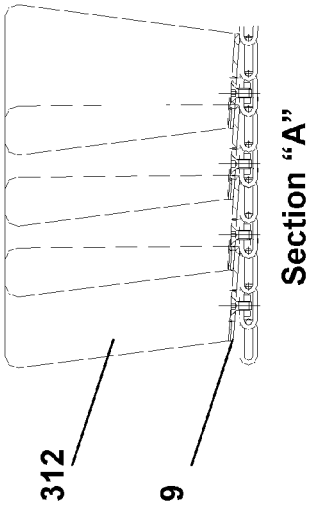
FIG. 4A shows a cross-sectional view of the belt of FIG. 4, performed along the line A-A of the latter figure.

As mentioned above, in the present embodiment the plant 1 is apt to allow a dry cooling of the ashes by adducting air at ambient temperature at the conveyor belt 31. As shown in FIGS. 4 and 4A, a preferred variant embodiment provides for said cooling on the conveyor belt 31, on which there are formed openings 9 for the cooling air, for example in form of holes or, as shown, elongated slots obtained by milling.

Still according to said preferred variant embodiment and with reference to FIG. 1, a compartmented region 4 arranged below the conveyor belt 31 is provided.

In FIG. 1, for the sake of simplicity a single compartmented region 4 has been shown, which region is placed downstream the boiler's bottom with respect to the direction of advancement of the transport surface 311. In the considered example the compartmented region 4 is arranged below said transport surface 311 and placed between the forward and backward run of the belt 31. However, the division into compartments preferably extends longitudinally along the whole lower part of the transport surface 311. The compartmented region 4 is laterally defined by side walls of the casing 32.

Furthermore, according to a variant embodiment, several compartmented regions can be provided, which are discretely distributed along the transport surface 331, below the latter.

Into the compartmented region 4 arrives the cooling air that enters from inlets 322 arranged on the casing 32. Preferably, such adduction is passive, meaning that the air is recalled from the exterior through the inlets 322 and inside the compartmented region 4 by the depression present in the combustion chamber 2.

The compartmented region 4 is apt to limit the outlet of the cooling air that enters into the region, so that almost the all air passes through the openings 9 of the transport belt 31, so effectively cooling the ash bed received on the transport surface 311.

The compartmented region 4 is delimited by transverse baffles 6, preferably arranged orthogonally and transversally to the transport surface 311 with respect to the direction of advancement and apt to seal the cooling air by a series of obstructions.

Furthermore, and with reference to the variant embodiment of FIGS. 3 and 3A, the compartmented region 4 can be delimited below by tilted surfaces of a slab 5 for the recovery of eventual fines lost during transport on the surface 311. Each of the slabs 5 has a corresponding lower end port 72 that can be selectively opened outwards by means of a mechanism 71, preferably of a hinge type, for the downflow of fines towards the bottom of the containment casing 32. Preferably, the downflow system of the fines based on port elements 72—mechanisms 71 is timed. During normal operation the port 72 is closed, so maintaining a sealing for the air, being directly in contact with the side wall of the casing 32.

Figure 3B:
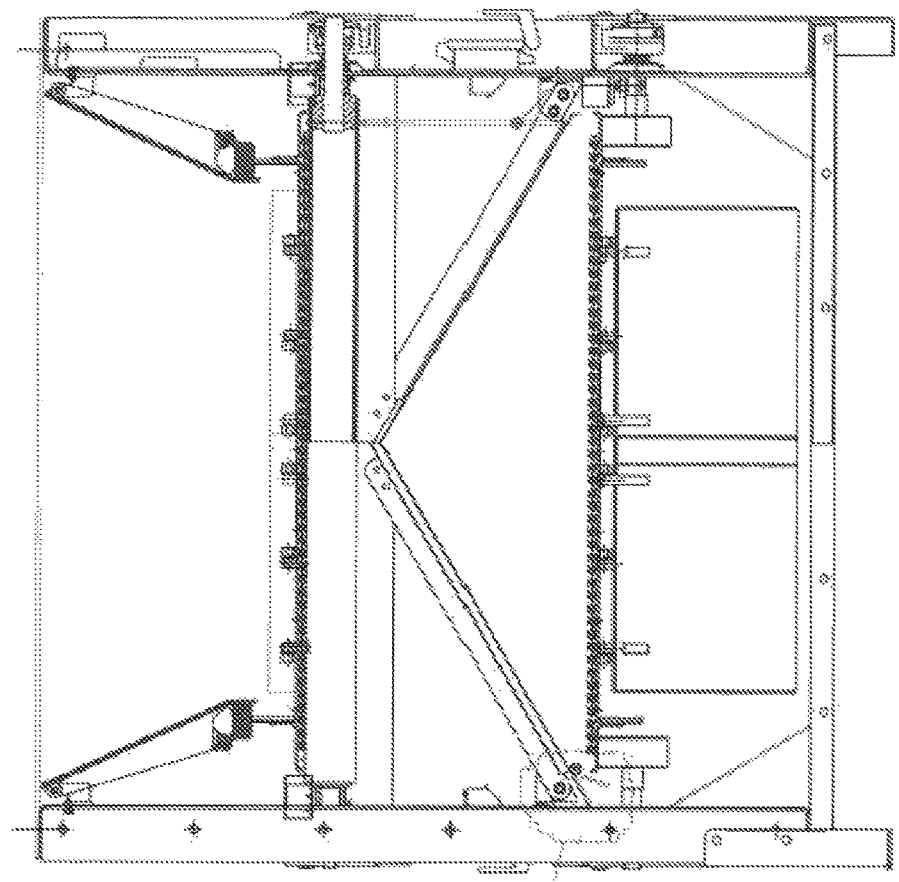
FIG. 3B shows the same view of FIGS. 3 and 3A, in a variant embodiment in which a cleaning system of the type described in PCT/IB2009/051943 is provided.
Figure 3B:
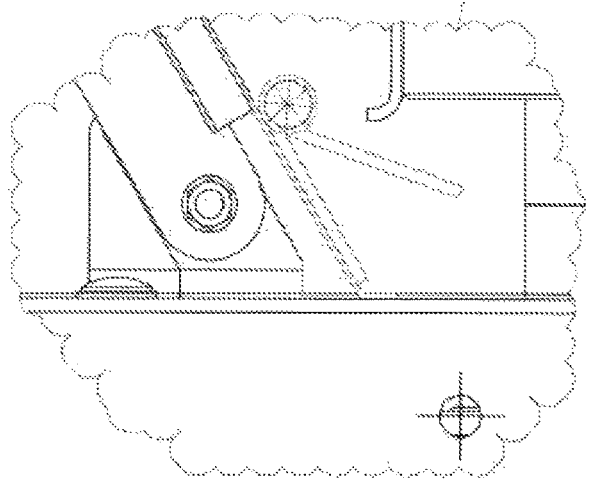

In the variant embodiment of FIG. 3B, a fine recovering system, or cleaning, is provided, preferably of the type described in PCT/IB2009/051943.

The transport region 80 and the compartmented region 4 are synergic in limiting escapes of cooling air attracted in the region, so that air passes almost integrally through the openings 9 of the transport belt 31, so effectively cooling the bed of material received on the transport surface 311.

So, a fixed path for the cooling air or for a treatment gas is realized. The layer of material transported on the surface 311 is cooled by an ambient air flow crossing it transversally from below to the above for the whole length of the cooling region made by the compartmented region 4 and comprised between the first and the last transverse baffle 6 and by the transport region 80 confined by means of containment means 8. The cooling air that crosses the bed of material is attracted in the boiler 2 from the bottom thereof, being the boiler at pressure values lower than the environment of the casing 32.

So, the interaction mechanism between air or treatment gas and transported material is maximized.

With specific reference to FIGS. 5 and 5A, a structural solution related to said compartmented region 4 is shown, wherein said transverse baffles 6 are still provided, in this case combined with partitions or side baffles 51 longitudinally extending along the belt 31, substantially parallel to it, above the transport surface 311 and each according to a respective side of the latter, where the contact or the proximity of said baffles with the containment partitions, or fins, of the transport belt 31, here denoted with 101, allows limiting the passage of the air that does not cross the perforated belt 31.

Also according to this constructional variant, each of the tilted surfaces of the slab 5 has a lower end port 72 that can be selectively opened outwards by means of a mechanism 71, preferably of a hinge type, for the downflow of fines towards the bottom of the containment casing 32. So, when—during the normal operation—the port 72 is closed, it maintains a seal for the air, being directly in contact with the side wall of the casing 32.

A further preferred configuration, possible if the material does not contain incompressible parts, provides for the absence of the baffles 51 and the making of a side seal for the air by forming a bed of material on the transport surface 311 of height such as to cover the lower edge of containment side boards 102 fixed to the casing 32.

In this and the previous constructional variant of FIGS. 5 and 5A the above described containment means 8 are not necessarily provided. Such constructional variants are based on the presence, in a plant for transport and cooling of waste apt to be used in combination with a combustion chamber, of:

- a conveyor belt 3 for transporting waste, preferably of the type above described, apt to be arranged below the combustion chamber 2 and having a containment casing 32 and a transport surface 311 having openings 9 for the passage of cooling air, the transport surface 311 being apt to receive waste produced into the combustion chamber 2 substantially in the form of a continuous bed; and
- means for cooling the ashes received on the transport surface 311, such cooling means comprising at least a compartmented region 4 preferably as above described, arranged below the transport surface 311 and wherein cooling air enters passively adducted by a depression present in the environment of the transport conveyor belt 3, wherein the compartmented region 4 is configured so to limit escapes of the air adducted into it, and wherein the overall arrangement is such that, in use, the cooling air passively entering the compartmented region 4 crosses the openings 9 into the transport surface 311 and the bed of waste received on the latter, can be the object of independent protection with respect to, as already said, the presence of containment means 8.

The preferred configurations described so far are particularly advantageous also in the case where the transported material needs a postcombustion by means of ambient air or preheated air in order to reduce the unburnt content therein.

Figures from 6 to 7A refer to a loose material transport plant according to a further preferred embodiment of the invention. Such plant is generally denoted with 500. It will be described only with reference to the elements differentiating it from the first embodiment described above.

The plant 500 of the present embodiment is associated with, and in particular directly connected to, a reaction oven 502 and receives the material through a loading zone 501. In particular, the plant 500 is conceived for the transport and the treatment of the loose material by a technical gas, in the present example nitrogen for making inert the transport environment and for avoiding the oxidation of the transported material.

Figure 6:
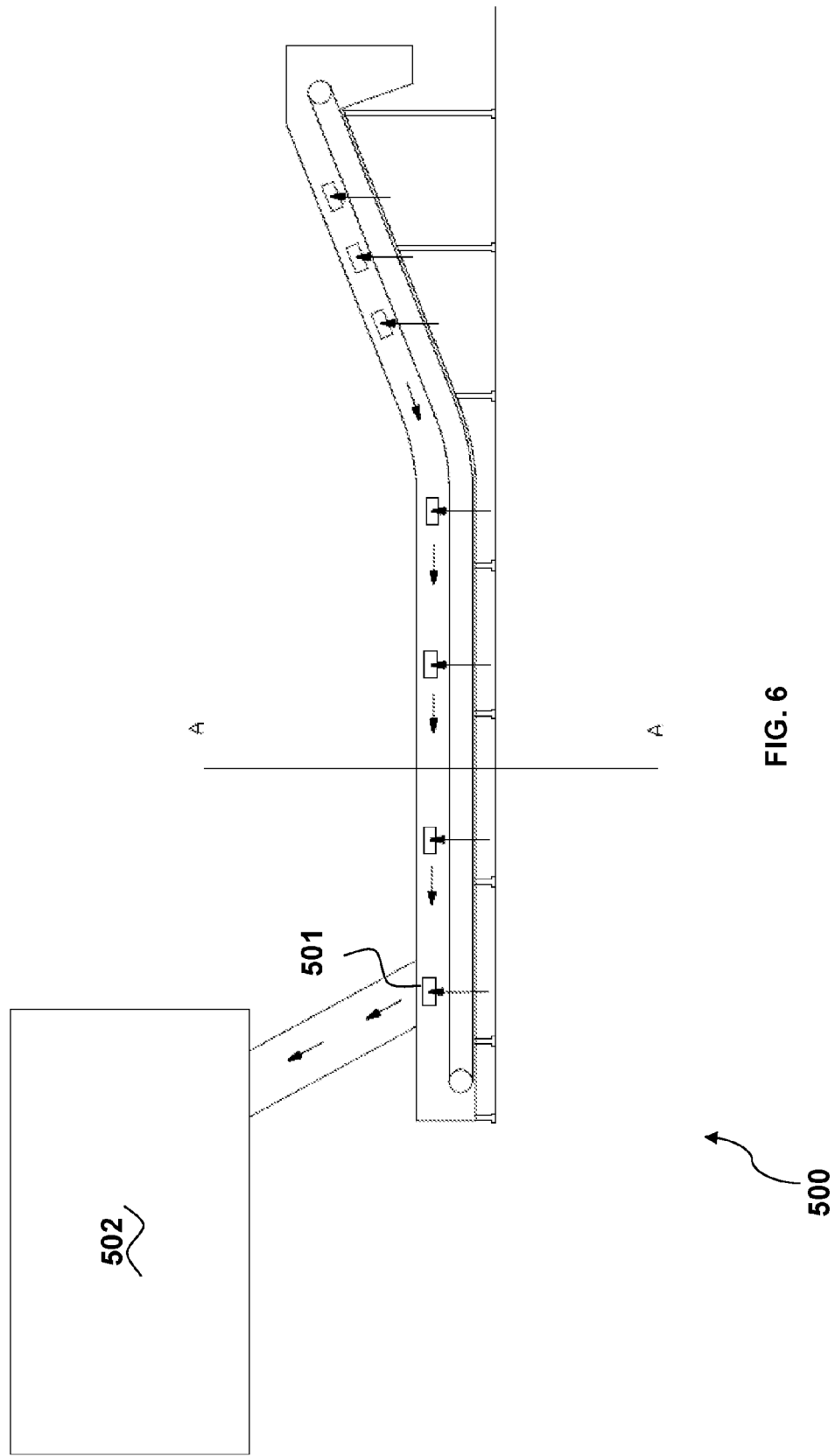
FIG. 6 shows a schematic representation in side view of a plant for the transport and treatment of loose material according to a further preferred embodiment of the invention.
Figure 7:
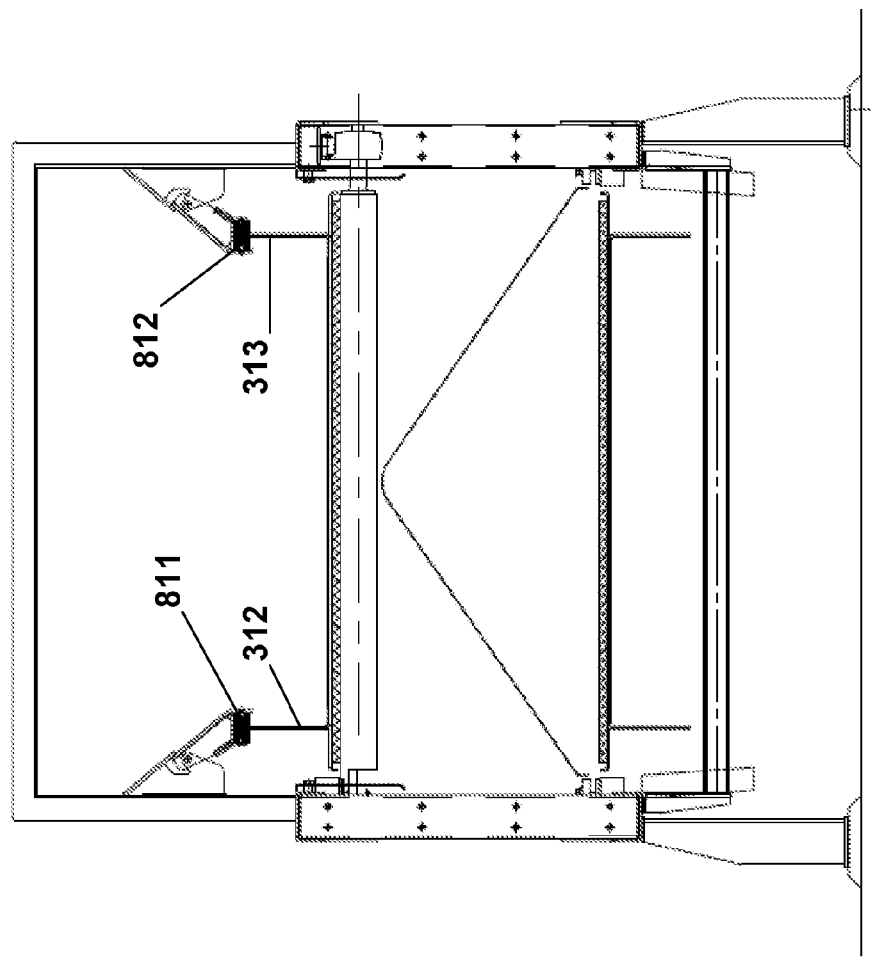
FIG. 7 shows a cross-sectional view of the plant in FIG. 6, performed along the line A-A of the latter figure and related to a preferred embodiment of a belt conveyor of said plant.

In FIG. 7 a transversal section according to the line A-A of FIG. 6 of the conveyor belt is shown. The constructional solution for the transport region wherein the technical gas is insufflated is analogous to that of the previous embodiment. There are provided the wear elements, or sliding blocks, 811 and 812 analogous to those above described and therefore denoted with the same reference numbers. They are directly in contact with fins 312 and 323 already described above. In FIG. 7A the formation of the groove 800 after repeated operation cycles can be appreciated.

Such configuration allows confining the whole transport zone so optimizing the contact between the transported material and the treatment gas, avoiding gas dispersions towards the external environment. In particular, in this preferred configuration the lower zone of the conveyor belt can be open, that is not included in a metallic containment casing, so as to facilitate the cooling of the transport belt in the backward run thanks to the thermal exchange with ambient air.

In general terms, such open configuration (more easy to construct) can be realized each time the treatment gases do not need be confined or the confinement with respect to the external environment is not necessary.

In this case the function of the side containment boards and of the associated abutment members, or sliding blocks, remains that of avoiding that the heterogeneous transported material pours out from the transport section.

The present invention has been up to here described with reference to preferred embodiments. It is to be intended that other embodiments are possible within the same inventive core, all falling within the scope of protection of the following claims.

The invention claimed is:

1. A transport system for the transport of combustion waste or other loose material, comprising:
    a belt conveyor for transporting the material, capable of being arranged at a material outlet opening from a combustion chamber to receive the material, and capable of transporting such material on a transport surface of said belt conveyor, and movable along a longitudinal direction of advancement;
    a containment casing enclosing said belt conveyor in a sealed manner; and
    a containment means for containing the material in a transport region, wherein said containment means comprises at least one pair of side boards, each extending above said transport surface at a respective side thereof and along said direction of advancement, and at least one abutment member made of a wearable material, associated with each of said side boards and capable of abutting in a sliding manner on said transport surface or on elements associated with said transport surface;
    wherein the transported material is confined in said transport region, which is defined bottomwise by said movable transport surface and laterally by said containment means;
    wherein said belt conveyor comprises a pair of longitudinal partitions or fins, each fixed to said transport surface and each raised therefrom on one side of said transport surface;
    wherein said abutment members are each capable of abutting on one of said longitudinal partitions or fins;
    wherein each of said abutment members is configured to permit forming a groove therein as a result of said longitudinal partitions or fins acting over repeated working cycles;
    wherein said containment means comprises adjustment means for adjusting angular positions of said abutment members with respect to said longitudinal partitions or fins; and
    wherein each of said abutment members is capable of establishing a seal confinement for powder and gas material in said transport region with the longitudinal partitions or fins on said transport surface.

2. The system according to claim 1, wherein each of said abutment members is fixed to the corresponding board.

3. The system according to claim 1, wherein each of said abutment members is a component wearable following said repeated sliding contact.

4. The system according to claim 1, wherein said containment casing is equipped with one or more inlets for cooling air or other treatment gas.

5. The system according to claim 4, comprising at least one compartmented region arranged in said containment casing, below said transport surface, wherein the overall arrangement is such that, in use, cooling air, or other treatment gas, introduced through said inlets crosses said compartmented region and said openings in said transport surface and the material received on the transport surface, said compartmented region being configured so as to limit air or other gas leaks.

6. The system according to claim 5, wherein the overall arrangement is such that cooling air, or other treatment gas, is passively returned through said inlets by negative pressure present in said containment casing.

7. The system according to claim 6, wherein said negative pressure present in said containment casing is derived from the negative pressure present in the combustion chamber or in another upstream feeding system.

8. The system according to claim 6 further comprising at least one transverse, mobile member in said transport region, said member being arranged transversally to said direction of advancement and movable with respect to said containment casing, which member is configured so as to permit the passage of the transported material and to reduce the flow of the treatment gas returned by negative pressure present in said upstream feeding system.

9. The system according to claim 8, wherein said transverse, mobile member is rotationally connected to said containment casing.

10. The system according to claim 5, wherein said compartmented region develops longitudinally along said transport surface.

11. The system according to claim 5, wherein said compartmented region is laterally delimited by side walls of said containment casing and/or wherein said compartmented region is delimited bottomwise by an element or slab having tilted surfaces for fines recovery.

12. The system according to claim 5, wherein said compartmented region comprises a plurality of transverse baffles, arranged transversally to said transport surface with respect to said direction of advancement.

13. The system according to claim 1, wherein said transport surface is equipped with openings for the passage of cooling air or other treatment gas towards said transport region.

14. A transport method for the transport of combustion waste or other loose material that uses a system comprising:

a belt conveyor for transporting the material, capable of being arranged at a material outlet opening from a combustion chamber to receive the material, and capable of transporting such material on a transport surface of said belt conveyor, and movable along a longitudinal direction of advancement;

a containment casing enclosing said belt conveyor in a sealed manner; and a containment means for containing the material in a transport region, wherein said containment means comprises at least one pair of side boards, each extending above said transport surface at a respective side thereof and along said direction of advancement, and at least one abutment member made of a wearable material, associated with each of said side boards and capable of abutting in a sliding manner on said transport surface or on elements associated with said transport surface;

wherein the transported material is confined in said transport region, which is defined bottomwise by said movable transport surface and laterally by said containment means;

wherein said belt conveyor comprises a pair of longitudinal partitions or fins, each fixed to said transport surface and each raised therefrom on one side of said transport surface;

wherein said abutment members are each capable of abutting on one of said longitudinal partitions or fins;

wherein each of said abutment members is configured to permit forming a groove therein as a result of said longitudinal partitions or fins acting over repeated working cycles;

wherein said containment means comprises adjustment means for adjusting angular positions of said abutment members with respect to said longitudinal partitions or fins; and wherein each of said abutment members is capable of establishing a seal confinement for powder and gas material in said transport region with the longitudinal partitions or fins on said transport surface, wherein the method comprises transporting the combustion waste or other loose material on the belt conveyor.

* * * * *